United States Patent [19]

Yamamoto

[11] Patent Number: 4,911,472
[45] Date of Patent: Mar. 27, 1990

[54] SLIDER FOR PASSIVE SEAT BELT SYSTEM

[75] Inventor: Kazuo Yamamoto, Sagamihara, Japan

[73] Assignee: Nippon Seiko Kabushiki Kaisha, Tokyo, Japan

[21] Appl. No.: 275,361

[22] Filed: Nov. 23, 1988

[30] Foreign Application Priority Data

Nov. 25, 1987 [JP] Japan ............................ 62-179314[U]

[51] Int. Cl.⁴ ............................................. B60R 22/06
[52] U.S. Cl. .................................................. 280/804
[58] Field of Search ......................... 280/802, 804, 808

[56] References Cited

U.S. PATENT DOCUMENTS

| 4,296,944 | 10/1981 | Matsuoka et al. | 280/804 |
| 4,410,061 | 10/1983 | Terabayashi | 280/802 |
| 4,462,613 | 7/1984 | Nishimura et al. | 280/804 |
| 4,575,120 | 3/1986 | Volk et al. | 280/804 |
| 4,681,347 | 7/1987 | Tamura et al. | 280/804 |
| 4,730,844 | 3/1988 | Patterson | 280/804 |

FOREIGN PATENT DOCUMENTS 57-157556 10/1982 Japan .
57-159551 10/1982 Japan .
61-134459 8/1986 Japan .
62-25413 6/1987 Japan .

Primary Examiner—Richard A. Bertsch
Attorney, Agent, or Firm—Wegner & Bretschneider

[57] ABSTRACT

A slider is provided for use in a passive seat belt system. The system is composed of a rail adapted to receive a portion of the slider, an elongated drive means for driving the slider along the rail, a webbing fastened to the slider and displaceable between an occupant-restraining position and an occupant-releasing position, and a latch means for holding the slider in place at the occupant-restraining position. The slider includes a leg portion and a main portion. The leg portion extends substantially in parallel with the length of the rail when the slider is combined with the rail and is provided with a synthetic resin cover applied thereon. The main portion extends from a side edge of the leg portion substantially at a right angle relative to the length of the leg portion as seen in a transverse cross-section and when the slider is combined with the rail, in a direction away from the rail. The main portion defines a webbing-fastening head portion at a free end portion thereof.

15 Claims, 5 Drawing Sheets

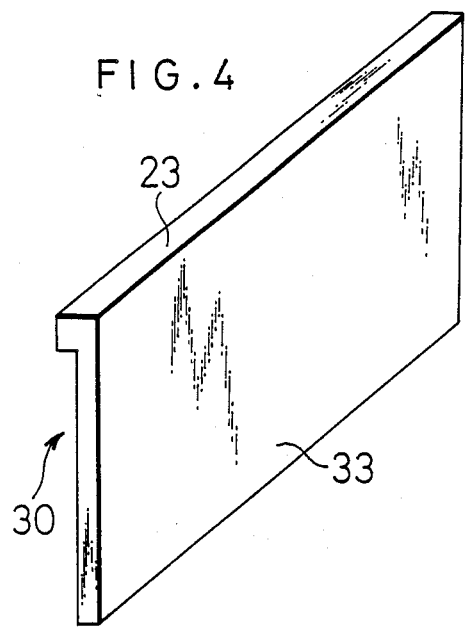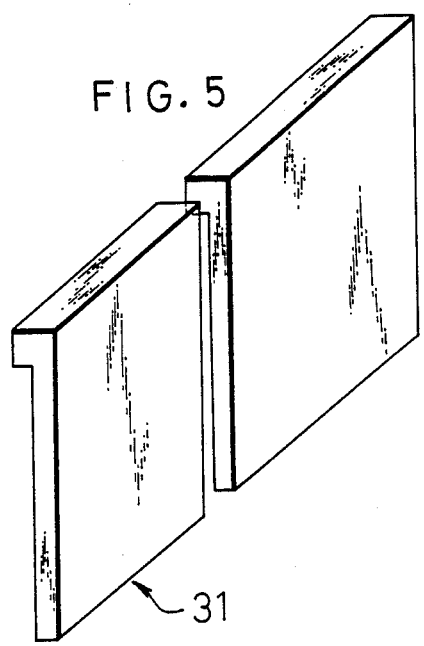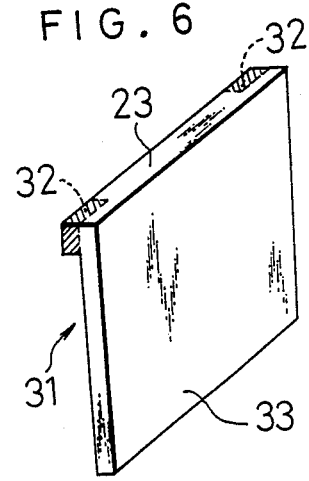

SLIDER FOR PASSIVE SEAT BELT SYSTEM

BACKGROUND OF THE INVENTION (1) Field of the Invention:

This invention relates to a slider for a passive seat belt system in which a webbing for protecting an occupant of an automotive vehicle is automatically applied to him after he sits in a seat of the automotive vehicle. This invention is also concerned with a passive seat belt system making use of such a slider.

(2) Description of the Related Art:

A passive seat belt system is constructed, for example, of a rail provided on a interior roofside of a vehicle substantially along a longitudinal axis of the vehicle, a slider provided inside the rail displaceably back and forth substantially along the longitudinal axis of the vehicle, and a webbing fastened to the slider. The slider is caused to move by a drive member arranged inside the rail, such as a tape or wire, so that when an occupant gets off the vehicle, the slider is caused to move toward the front of the vehicle to have the webbing separated from an associated seat but when the occupant has sat in a seat, the slider is caused to move toward the rear of the vehicle to have the webbing approached toward the seat and hence applied to the occupant. The above-described movements of the slider are controlled by detecting opening and closure of an associated door.

A slider suitable for use in such a passive seat belt system has a webbing-fastening head portion at one end thereof and a slider leg portion at the other end thereof. The slider receives a drive force from a drive member via a cover layer formed on the outer periphery of the slider leg portion and made of a synthetic resin.

Such a slider is required to withstand a large tensile force which is applied to an occupantrestraining webbing in the event of an emergency of the vehicle. In order to meet this requirement, it is made of a high-strength material such as high carbon steel and moreover, includes a thicker portion so as to enhance its strength at a part exposed to the tensile strength. For the fabrication of a slider of the above structure, a fabrication process has been adopted that a slider main body is formed by hot forging, casting or press forming and a synthetic resin is then applied on the outer circumference of a slider leg portion at which the slider main body is received slidably in an associated rail.

When a slider main body is fabricated by hot forging as in the conventional process mentioned above by way of example, problems arise due to the high strength of its material that facilities having high working ability are required, many steps are needed to form a slider from the material and the slider tends to have poor precision.

When a slider main body is fabricated by casting on the other hand, the slider main body tends to contain one or more cavities to have poor strength and also requires post working, thereby failing to reduce the fabrication cost.

In addition, the fabrication of a slider main body by press forming requires, as post working, to weld plural parts together or to secure them together with rivets so as to form a thicker portion of a slider leg portion. Accordingly, more fabrication steps are required and more complex parts control and management are needed.

With a view toward solving such problems, it has been proposed, as in the invention disclosed in Japanese Utility Model Laid-Open No. 134459/1986, to form a slider blank from plate material of a uniform thickness by stamping and then to forge the slider blank to form a thicker portion which serves as a slider leg portion.

Since the slider blank is formed by stamping and the thicker portion serving as a slider leg portion is thereafter formed, the slider according to the invention of the above patent publication is however accompanied by problems such that forging is required for each slider blank, the precision of the main portion of the slider is reduced due to high impacts applied upon forging, more steps are required in total upon mass fabrication of sliders and the fabrication cost increases. Where the leg portion of the slider is covered with a synthetic layer, it is preferable as a countermeasure for the prevention of cracking at the time of molding that the thickness of the cover be uniform. It is however not very easy to form, by forging, a slider leg portion having a shape analogous to the shape of the final product.

SUMMARY OF THE INVENTION

In view of the above-described drawbacks of the conventional technology, it is an object of this invention to provide a slider which features easy fabrication and assures sufficient strength without need for conducting forging, which requires an apparatus having high working ability, in order to form a thick part which will serve as a slider leg portion.

Another object of this invention is to provide a passive seat belt system making use of such a slider.

In one aspect of this invention, there is thus provided a slider for a passive seat belt system, said system composed of a rail adapted to partly receive the slider, an elongated drive means for driving the slider along the rail, a webbing fastened to the slider and displaceable between an occupant-restraining position and an occupant-releasing position, and a latch means for holding the slider in place at the occupantrestraining position, characterized in that the slider comprises:

a leg portion adapted to be received in the rail with the longitudinal axis of said leg portion extending substantially in parallel with the length of the rail, and said leg portion being provided with a synthetic resin cover applied thereon; and a main portion extending from a side edge of the leg portion substantially at a right angle relative to the length of the leg portion as seen in a transverse cross-section and when the slider is combined with the rail, said main portion extending in a direction away from the rail, and said main portion defining a webbing-fastening head portion at a free end portion thereof.

In another aspect of this invention, there is also provided a slider formed of a generally flat plate and having a thicker leg portion at one end thereof and a webbing-fastening head portion at the other end thereof, characterized in that a main body of the slider is formed of a drawn material having a thinner flat part and a thicker part, the thicker leg portion is formed by the thicker part, and the thicker part is circumferentially covered with a synthetic resin.

In a further aspect of this invention, there is also provided a passive seat belt system composed of a rail, a slider movable along the rail, an elongated drive means for driving the slider along the rail, and a webbing fastened to the slider and displaceable between an occupant-restraining position and an occupant-releasing position, characterized in that: the slider comprises:

a leg portion extending substantially in parallel with the length of the rail and provided with a synthetic resin cover applied thereon, and a main portion extending from a side edge of the leg portion substantially at a right angle relative to the length of the leg portion in a direction away from the rail as seen in a transverse cross-section and defining a webbing-fastening head portion at a free end portion thereof; and the rail defines:

a first guide channel for guiding the leg portion of the slider, and a second guide channel for guiding the elongated drive means.

In a still further aspect of this invention, there is also provided a passive seat belt system composed of a rail, a slider movable along the rail, and a webbing fastened to the slider and displaceable between an occupant-restraining position and an occupant-releasing position, characterized in that: the slider comprises:

a leg portion received in the rail, extending substantially in parallel with the length of the rail and provided with a synthetic resin cover applied thereon, and a main portion extending from the leg portion in a direction away from the rail and defining a webbingfastening head portion at a free end portion thereof; and the leg portion is recessed at a longitudinally central part thereof in a direction perpendicular to an imaginary plane in which the slider generally lies.

Since the thicker portion which will serve as a slider leg portion is formed by drawing upon formation of a drawn material, it is no longer required to change the thickness after formation of individual slider blanks. The thickness change can therefore be effected by a continuous operation in a step preceding the formation of individual slider blanks. It is hence possible to mass-fabricate sliders through simple steps while assuring necessary strength. Since a final slider blank analogous in shape to the final product can be formed precisely, it is possible to make uniform the thickness of a synthetic resin cover.

More specifically, the present invention can bring about the following advantages.

(1) Since the thickness change of the slider leg portion is effected by drawing, it is not required to apply separate forging to each slider blank to form such a thicker portion and in addition, the reduction in the precision of a slider due to high impacts at the time of forging does not occur.

(2) Since drawing is not applied to individual slider blanks but is performed in a step preceding the formation of individual slider blanks, the number of working steps does not increase too much even when a number of sliders are fabricated continuously.

(3) Owing to the omission of the step in which a thickness change is effected by forging, it is possible to omit deburring and annealing steps which would be indispensable if forging were relied upon.

(4) The flat part of each slider is shaped by stamping on a press. A slider blank can therefore be formed easily by a single stamping operation even when the slider blank has such a complex shape as including a notch engageable with an anchor pin, positioning holes useful upon forming a resin molding, holes for the attachment of an ERB, etc., so that the fabrication cost of the slider can be reduced. In addition, a synthetic resin cover can be applied with a uniform thickness so that cracking can be avoided upon molding of the resin cover.

In summary, the present invention can provide high-precision sliders at a low cost and with an improved productivity.

BRIEF DESCRIPTION OF THE DRAWINGS

The above and other objects, features and advantages of the present invention will become apparent from the following description of the invention and the appended claims, taken in conjuction with the accompanying drawings, in which:

FIG. 4 shows the slider material.

FIG. 5 shows the slider material cut into a predetermined length.

FIG. 6 shows the slider blank having portions cut off.

DETAILED DESCRIPTION OF THE INVENTION AND PREFERRED EMBODIMENT

Figure 1:
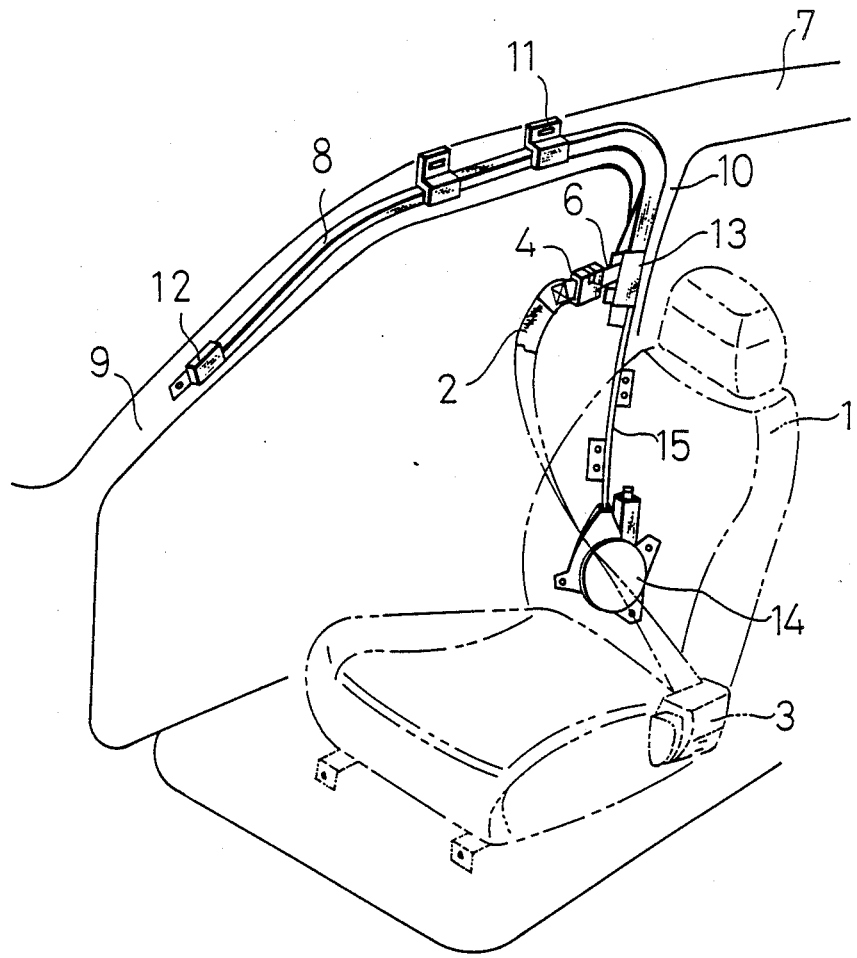
FIG. 1 is a perspective view schematically showing the overall construction of a passive seat belt system.

Referring first to FIG. 1, a basal portion of a webbing 2 is wound in an inboard retractor 3 provided on a lower side wall of a seat 1, and its free end portion is attached via an emergency release buckle (ERB) 4 to a slider 6 (see FIG. 3) received in an anchor latch 13.

On the other hand, a rail 8 is mounted on a roofside which is an inner wall of a roof 7 of a vehicle body. The slider 6 is loose-fitted in the rail 6 so that the slider is allowed to move back and forth along the longitudinal axis of the vehicle body.

Describing the rail 8 in detail, a front end portion of the rail 8 is arranged along a front pillar 9 while a rear end portion of the rail 8 extends along a center pillar 10. The rail 8 is fixed at suitable locations to the roof 7 by means of rail brackets 11. A front end switch 12 is provided at the front end of the rail 8 so as to detect that the slider 6 has reached the front end of the rail 8. On the other hand, the above-described anchor latch 13 is attached to the rear end of the rail 8 whereby the slider 6 is held in place when the seat belt system is in use.

Figure 2:
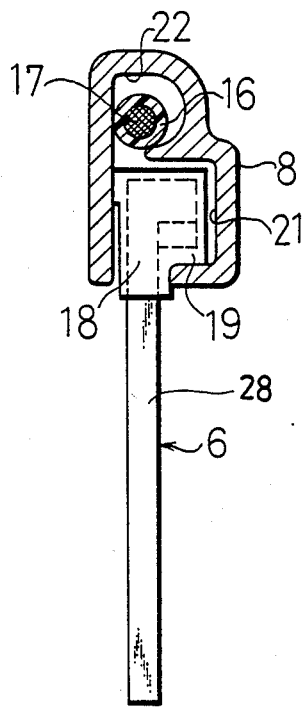
FIG. 2 is a cross-sectional view showing the relationship between a slider and a rail.
Figure 3:
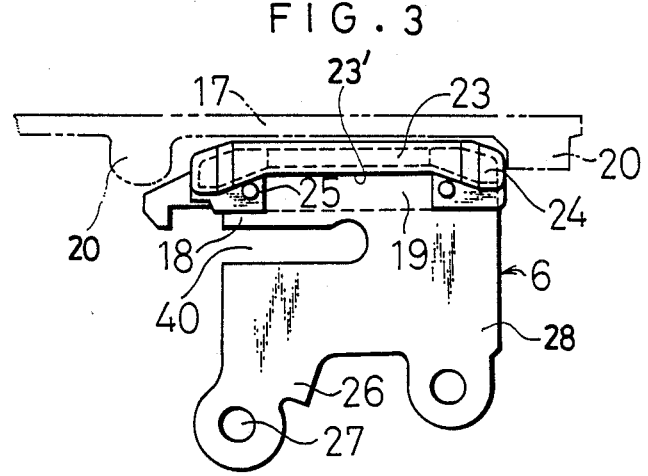
FIG. 3 is a side view also showing the relationship between the slider and the rail.

As depicted in FIGS. 2 and 3 by way of example, a wire 17 covered with a resin coating 16 and provided with hooks 20 which are alternately brought into contact with a leg portion 18 of the slider 6 internally extends through the rail 8. As shown in FIG. 15, a basal end portion of the wire 17 extends through an outer tube 15 and is wound on a reel (not shown) in a drive unit 14.

The rail 8 defines a first guide channel 21 for the leg portion 18 of the slider 6 and a second channel 22 through which the wire 17 extends. The leg portion 18 of the slider 6 and the hooks 20 of the wire 17 are received within the first channel 21. Operation of the passive seat belt system is as described above.

As shown in FIGS. 2 and 3, the slider 6 includes a main portion 28 which extends from a longitudinal edge of the leg portion 18 substantially at a right angle relative to the length of the leg portion and when the slider is combined with the rail 8, in a direction away from the rail. The slider 6 has a resin molding 19 on the outer circumference of the leg portion 18. The resin molding 19 serves to reduce the frictional resistance between the leg portion 18 and the first guide channel 21 of the rail 8 and is brought into contact with either one of the hooks 20 of the wire 17. In order to prevent dropping and cracking of the resin molding 19, a projection 24 is formed at each longitudinal end of a thicker portion 23 of the leg portion 18. The projection 24 extends in a direction perpendicular to an imaginary plane in which the slider 6 generally lies. A longitudinal central edge portion 23' of the thicker portion 23 of the leg portion 18, said edge portion facing the main portion 28, is recessed.

In the vicinity of the thicker portion 23 of the leg portion 18, plural holes 25 are formed as references for positioning the resin molding 19 upon formation of the resin molding 19.

Plural circular holes 27 are formed in a webbing-mounting head portion 26 which is in turn formed at a free end portion of the main portion 28. The ERB 4 is attached to the webbing-mounting portion 26 by way of the circular holes 27. The webbing 2 (see FIG. 1) is fastened to the ERB 4.

FIGS. 4 through 10 illustrates fabrication procedures of the slider 6 according to this invention.

FIG. 4 shows a slider material 30, in which a thicker portion 23 having a thickness substantially equal to the thickness of the leg portion 18 has been formed along one of side edges thereof by simply subjecting a band plate to drawing.

As depicted in FIG. 5, the slider material 30 is cut into a predetermined length.

As illustrated in FIG. 6, a slider blank 31 which has been cut into the predetermined length is worked on a press to cut off portions 32 indicated by hatching so that the remaining portions have substantially the same thickness as a flat portion 33 of the slider blank 31.

Figure 7A:
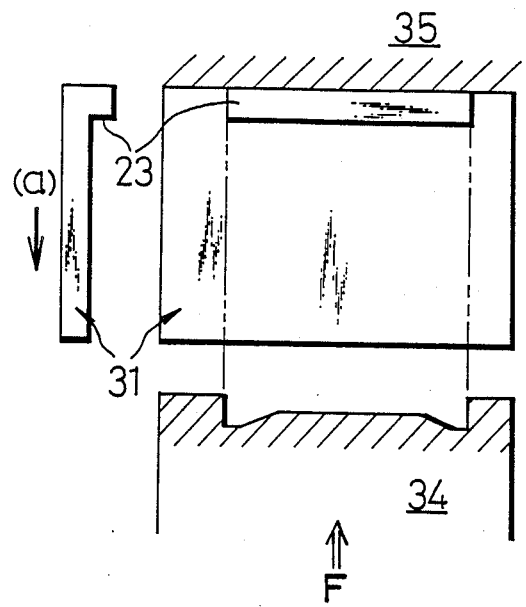
FIGS. 7a, 7b, and 7c, show the slider blank press-formed by shaping dies.
Figure 7B:
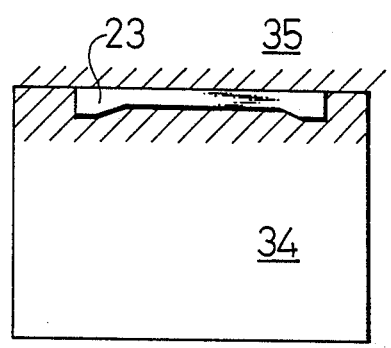
Figure 7C:
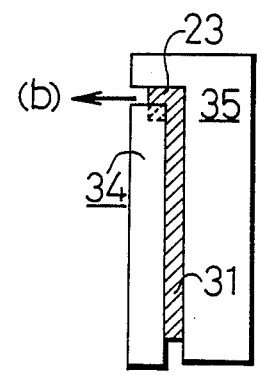

The slide blank 31 is, as shown in FIGS. 7a, 7b and 7c, press-formed by a shaping male die 34 and a matching shaping female die 35 into a shape such that both longitudinal end portions of the thicker portion 23 project toward the webbing-fastening head portion 26, namely, in a direction indicated by arrow (a). Incidentally, FIG. 7b shows a state in which the shaping male die 35 and shaping female die 36 are closed, while FIG. 7c illustrates that in the state shown in FIG. 7b the surplus material occurred as a result of the press-forming of the thicker portion 23 is finding a way in a direction indicated by arrow (b).

Figure 8:
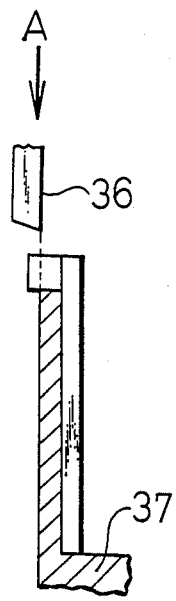
FIG. 8 shows the slider blank having surplus material cut off.
Figure 9:
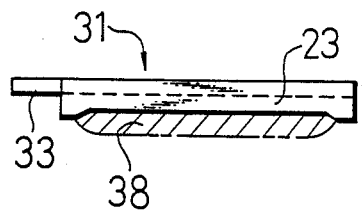
FIG. 9 shows the slider blank with the surplus material removed.
Figure 10:
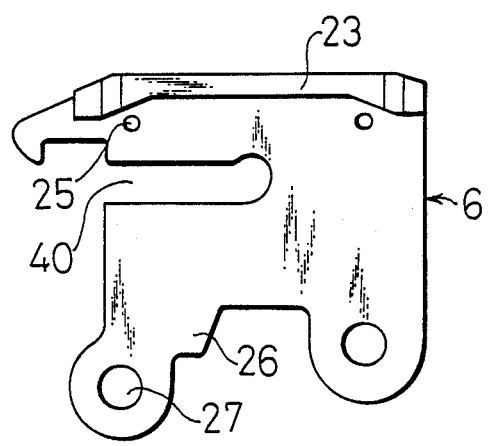
FIG. 10 shows the slider blank after the finish working.

The slider blank 31 in which the shape of the thicker portion 23 has been formed by the pressing is then worked further. As shown in FIG. 8, the surplus material occurred in the preceding step is cut off together with a portion 38, which is indicated by hatching in FIG. 9, by a shaping male die 36 and a matching shaping female die 37, whereby the thicker portion 23 is worked into such a shape that a portion of the thicker portion 23 other than both end portions thereof is thicker than the flat portion 33 but is thinner than said both end portions of the thicker portion 23. Even when the rail 8 is bent outwardly convex as viewed in a direction transverse to the longitudinal axis of the vehicle, the above shape is effective for ensuring smooth passage of the leg portion 18 of the slider 6 through the bent portion.

After completion of the shaping of the thicker portion 23, the resultant slider blank 31 is subjected to finish working, namely, stamping on a press so as to form a notch 40 engageable with the anchor latch 13, the positioning holes 25 useful upon formation of the resin molding 19 and the ERB-attaching circular hole 27.

The slider blank 31 which has been subjected to the finish working is processed further to form the resin molding 19 as an integral member on the leg portion 18 of the slider 6, so that a slider is provided as a completed product (see FIG. 3). Although the resin molding 19 has been formed by integral molding of the synthetic resin on the slider blank 31, a synthetic resin member formed separately may be fixed with an adhesive or the like or a metal base may be formed and a resin coating may then be applied on the surface of the metal base.

I claim:

1. A slider for a passive seat belt system comprising a rail adapted to partly receive the slider, an elongated drive means for driving the slider along the rail, a webbing fastened to the slider and displaceable between an occupant-restraining position and an occupant-releasing position, and a latch means for holding the slider in place at the occupant-restraining position, comprising:
    a leg portion adapted to be received in the rail with the longitudinal axis of said leg portion extending substantially in parallel with the length of the rail, and said leg portion being provided with a synthetic resin cover applied thereon; and
    a main portion extending from a side edge of the leg portion substantially at a right angle relative to the length of the leg portion as seen in a transverse cross-section;
    wherein when the slider is combined with the rail, said main portion extends in a direction away from the rail, and wherein said main portion defines a webbing-fastening head portion at a free end portion thereof.

2. The slider as claimed in claim 1, wherein the synthetic resin cover is in the form of a resin molding.

3. The slider as claimed in claim 1, wherein the leg portion has a thicker portion along a longitudinal edge thereof located away from the main portion.

4. The slider as claimed in claim 3, wherein a longitudinal central edge portion of the thicker portion of the leg portion, said edge portion facing the main portion, is recessed.

5. The slider as claimed in claim 3, wherein the leg portion defines at least one hole in the vicinity of the thicker portion of the leg portion and the hole serves as a reference for positioning the resin molding.

6. The slider as claimed in claim 3, wherein the thicker portion is recessed at a longitudinally central part thereof in a direction perpendicular to the plane of the slider.

7. The slider as claimed in claim 1, wherein the main portion has an engaged means to be brought into engagement with the latch means so as to hold the slider in place at the occupant-restraining position.

8. The slider as claimed in claim 7, wherein the engaged means is in the form of an elongated notch formed in the vicinity of and in parallel with the leg portion.

9. In a passive seat belt system composed of a rail, a slider movable along the rail, an elongated drive means for driving the slider along the rail, and a webbing fastened to the slider and displaceable between an occupant-restraining position and an occupant-releasing position, the improvement wherein the slider comprises:

a leg portion extending substantially in parallel with the length of the rail and provided with a synthetic resin cover applied thereon, and a main portion extending from a side edge of the leg portion substantially at a right angle relative to the length of the leg portion in a direction away from the rail as seen in a transverse cross-section and defining a webbingfastening head portion at a free end portion thereof; and the rail defines:

a first guide channel for guiding the leg portion of the slider, and a second guide channel for guiding the elongated drive means.

10. The passive seat belt system as claimed in claim 9, wherein the leg portion of the slider defines a flat surface at an edge thereof farthest from the main portion and the first guide channel has a wall portion extending substantially in opposition to and in parallel with the flat surface of the leg portion over the entire travelling path of the slider.

11. The passive seat belt system as claimed in claim 9, wherein the rail has a substantially B-shaped transverse cross-section open at a part adjacent the lower end of the straight vertical line thereof so as to allow the main portion to extend out through the open part, the first guide channel is defined by a lower cavity of the B-shaped transverse cross-section, and the second guide channel is defined by an upper cavity of the B-shaped transverse cross-section.

12. A passive seat belt system comprising a rail, a slider movable along the rail, and a webbing fastened to the slider and displaceable between an occupant-restraining position and an occupant-releasing position, wherein the the slider comprises:

a leg portion received in the rail, extending substantially in parallel with the length of the rail and provided with a synthetic resin cover applied thereon, and a main portion extending from the leg portion in a direction away from the rail and defining a webbing-fastening head portion at a free end portion thereof; and wherein the leg portion is recessed at a longitudinally central portion thereof in a direction perpendicular to the length of the rail and to the direction of extension of said main portion.

13. The passive seat belt system as claimed in claim 12, wherein the main portion extends from a side edge of the leg portion substantially at a right angle relative to the length of the leg portion as seen in a transverse cross-section.

14. A process for manufacturing a slider, which comprises:

subjecting a band plate to drawing work to form a stock of L-shaped cross-section having a flat portion and a thicker portion, said thicker portion extending from an edge of said flat portion at a substantially right angle relative thereto and having a length shorter than a length of said flat portion as viewed in cross-section;

cutting said stock to a predetermined width, thereby forming a slider blank;

cutting opposite end portions of said thicker portion of said slider blank so that said opposite end portions are equal in thickness to said flat portion;

pressing said thicker portion so as to recess a central portion of a side of said thicker portion facing the length of said flat portion; and forming a webbing-attaching portion in said flat portion by punching.

15. The process as claimed in claim 14, wherein before forming the webbing-attaching portion, a side of said thicker portion opposite the flat portion is cut to form a recess in a central portion thereof.

* * * * *